United States Patent
Jen et al.

(10) Patent No.: US 7,609,326 B2
(45) Date of Patent: Oct. 27, 2009

(54) IMAGE SCALER AND METHOD OF THE SAME

(75) Inventors: Li-Huan Jen, Hsinchu (TW);
Chen-Hsun Ho, Hsinchu (TW);
Chia-Yu Yang, Hsinchu (TW);
Seng-Meng Wang, Hsinchu (TW)

(73) Assignee: VXIS Technology Corp., Hsinchu (TW)

( * ) Notice: Subject to any disclaimer, the term of this patent is extended or adjusted under 35 U.S.C. 154(b) by 748 days.

(21) Appl. No.: 11/294,492

(22) Filed: Dec. 6, 2005

(65) Prior Publication Data

US 2006/0126967 A1 Jun. 15, 2006

(30) Foreign Application Priority Data

Dec. 14, 2004 (TW) .............................. 93138667 A (51) Int. Cl.
*H04N 1/393* (2006.01)
*G06K 9/32* (2006.01)

(52) U.S. Cl. ...................... 348/581; 348/561; 348/704; 348/537; 382/298; 345/660

(58) Field of Classification Search ................. 348/581, 348/561, 704, 537; 382/298, 300; 345/660, 345/670, 671, 472, 472.1, 472.2
See application file for complete search history.

(56) References Cited

U.S. PATENT DOCUMENTS 7,133,053 B2* 11/2006 Chen .......................... 345/660

* cited by examiner

*Primary Examiner*—David L Ometz
*Assistant Examiner*—Jean W. Désir
(74) *Attorney, Agent, or Firm*—Rabin & Berdo, P.C.

(57) ABSTRACT

An image scaler includes a horizontal downscaler, a horizontal upscaler, and a vertical scaling unit. The horizontal downscaler is configured in front of the vertical scaling unit and the horizontal upscaler is configured in back of the vertical scaling unit, so as to operate in coordination with a selective control method. The selective control method controls an image input route depending on horizontal downscaling or upscaling requirements, so as to choose to go through or to bypass the horizontal downscaler or the horizontal upscaler to horizontally and vertically resize an image. In this way, the input signal is processed in only two stages, so that the present invention can not only reduce the process loading of the huge amount of the data volume in the final stage, and also can reduce power consumption.

7 Claims, 8 Drawing Sheets

IMAGE SCALER AND METHOD OF THE SAME

BACKGROUND OF THE INVENTION

1. Field of the Invention

The invention relates to an image scaler and method of the same, and more particular to an image scaler that can generate a high quality scaled image with a simplified circuit layout.

2. Description of the Related Art

Conventional techniques for monitor hardware are mature, and various image-scaling techniques for monitors are well developed, as well. For example, with reference to FIG. 7, U.S. Pat. No. 5,739,867 of "Methods and apparatus for upscaling an image in both horizontal and vertical directions" shows a preferred embodiment which includes an input data synchronizer 50, a first buffer area 51, a first-in first-out memory (hereafter abbreviated as FIFO) 52, a second buffer area 53, a vertical interpolator 54, and a horizontal interpolator 55. The first buffer area 51 includes a plurality of line buffers having an input terminal coupled to the input data synchronizer 50. The FIFO 52 outputs data according to the principle of first-in first-out. The second buffer area 53 includes a plurality of line buffers having an input terminal coupled to the FIFO 52. The vertical interpolator 54 includes an input terminal coupled respectively to a data output terminal of the FIFO 52 and an output terminal of the second buffer area 53. The horizontal interpolator 55 is coupled to an output terminal of the vertical interpolator 54.

Figure 7:
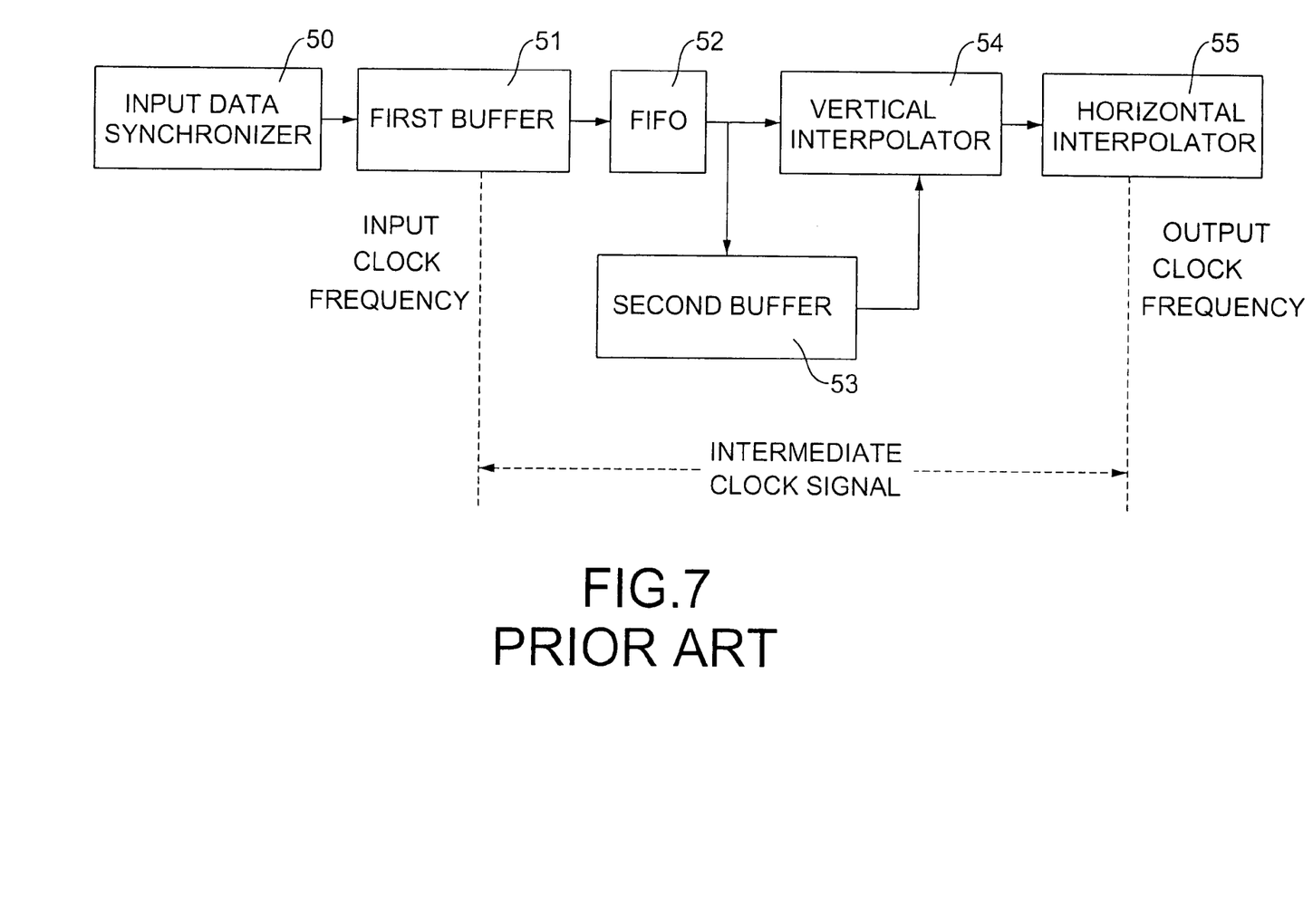
FIG. 7 is a functional block diagram of a preferred embodiment of U.S. Pat. No. 5,739,867.

The synchronization technique applied in image scaling techniques is very important. In the above described image upscaler structure of the preferred embodiment of the U.S. patent, input image data is first inputted to be synchronized, sent to the FIFO 52, and then upscaled in the vertical and horizontal directions.

According to the above arranged structure, when the image data is inputted, the image data is synchronized first. Then the image data is processed to be vertically and horizontally upscaled by the vertical interpolator 54 and the horizontal interpolator 55, respectively.

It can be understood according to FIG. 7 that a data processing frequency of the input data synchronizer 50 and the first buffer area 51 is determined by an input clock frequency. After processing by the input data synchronizer 50 and the first buffer area 51, an intermediate clock frequency is sent out, so that the FIFO 52, the second buffer area 53 and the vertical interpolator 54 operate under the intermediate clock frequency. Finally the horizontal interpolator 55 sends out the final output clock frequency. This design makes most of the components operate under the intermediate clock frequency, which has the drawbacks of having a high working frequency, heavy loading with huge amounts of data and high cost.

Moreover, U.S. Pat. No. 6,611,260 of "Ultra-high bandwidth multi-port memory system for image scaling application" is taken as another example. This patent discloses an image scaling memory system which eliminates the use of internal or external line memories by using an existing frame memory coupled with an input buffer and a plurality of output buffers for providing a vertical scaler with simultaneous parallel access to multiple lines of data.

Figure 8:
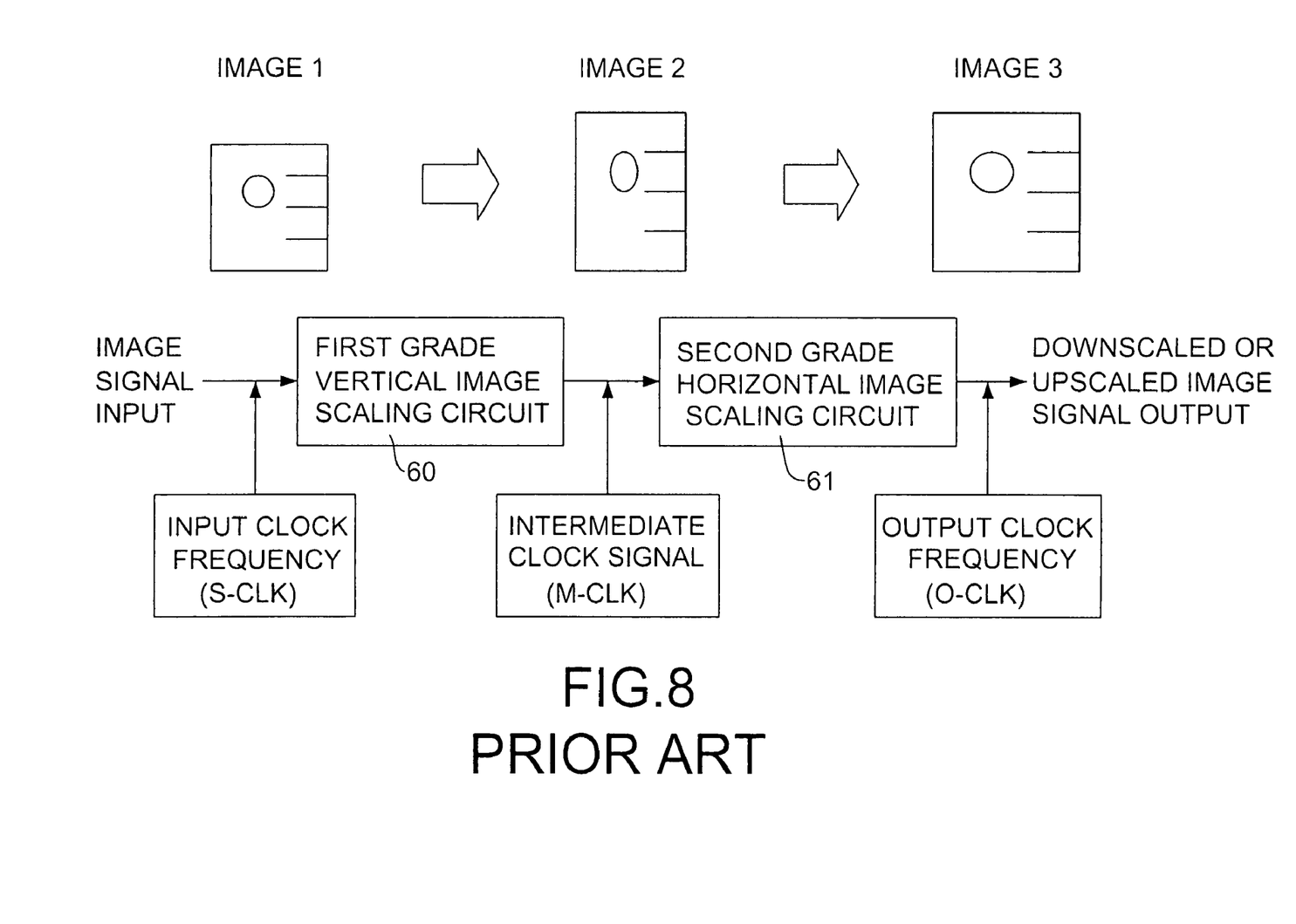
FIG. 8 is a functional block diagram of a preferred embodiment of U.S. Pat. No. 6,611,260.

With reference to FIG. 8, a preferred embodiment of the U.S. Pat. No. 6,611,260 includes a first stage vertical image scaling circuit 60 and a second stage horizontal image scaling circuit 61. When image data is inputted, the vertical image scaling circuit 60 first upscales a vertical signal of the image data, then the horizontal image scaling circuit 61 upscales a horizontal signal of the image data. Thereby the horizontal image scaling circuit 61 processes more data volume than the vertical image scaling circuit 60 does. Hence the horizontal image scaling circuit 61 requires a clock frequency that is higher than an output clock frequency O-CLK of an input clock frequency S-CLK to process the input image data. In addition, the horizontal image scaling circuit 61 requires a clock frequency that is even higher than an intermediate frequency M-CLK, so as to be able to speed up the outputting of the upscaled image data.

Therefore, it can be understood from the above two examples of the U.S. patents that the conventional techniques mainly focus on improving the buffer areas of an image scaler. However, the conventional techniques do not concentrate on the research and development to reduce the number working clock frequencies, as the two examples both require three different clock frequencies. Hence the conventional techniques tend to have complicated circuit designs, consume much power and have high design costs.

SUMMARY OF THE INVENTION

An image scaler of the present invention includes a horizontal downscaler, a horizontal upscaler, and a vertical scaling unit. The horizontal downscaler is configured in front of the vertical scaling unit and the horizontal upscaler is configured in back of the vertical scaling unit, so as to operate in coordination with a selective control method. The selective control method controls an image input route depending on horizontal downscaling or upscaling requirements, and can choose to go through or to bypass the horizontal downscaler or the horizontal upscaler to horizontally and vertically resize an image.

In this way, the input signal is processed in only two stages, so that the present invention can not only reduce the process loading of the huge amount of the data volume in the final stage, it can also reduce power consumption.

In comparison with conventional techniques, the present invention can achieve two-dimensional image scaling by using only two clock frequencies, so as to reduce the complexity of the circuitry required.

DETAILED DESCRIPTION OF THE INVENTION

Figure 1:
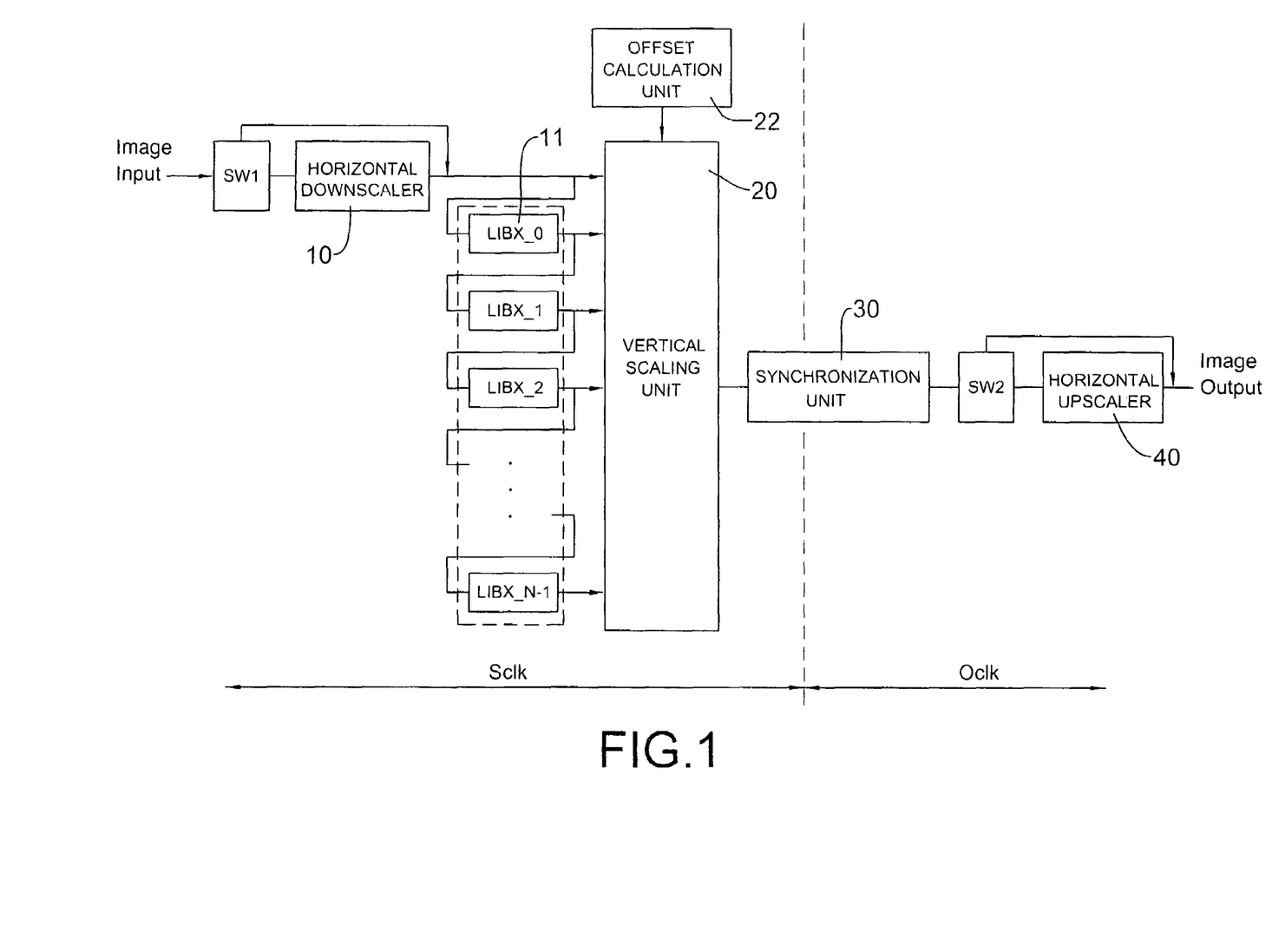
FIG. 1 is a functional block diagram of an example of a preferred embodiment of the present invention.

With reference to FIG. 1, an image scaler of the present invention includes a horizontal downscaler 10, a first buffer area 11, a vertical scaling unit 20, a synchronization unit 30, a horizontal upscaler 40, and two switches, SW1 and SW2.

The horizontal downscaler 10 is in front of the vertical scaling unit 20, and the horizontal upscaler 40 is in back of the vertical scaling unit 20. The first buffer area 11 is between the horizontal downscaler 10 and the vertical scaling unit 20. The synchronization unit 30 is between the vertical scaling unit 20 and the horizontal upscaler 40.

The horizontal downscaler 10 includes an input terminal and an output terminal. Image data is input into the input terminal of the horizontal downscaler 10. An input clock frequency Sclk is used as a base signal for image processing. The output terminal of the horizontal downscaler 10 is connected to the vertical scaling unit 20 through a first buffer area 11.

The first buffer area 11 includes a plurality of first line buffers LIBX_0~LIBX_N-1 connected in series. Each buffer has an input terminal and an output terminal. The input terminal of the first line buffer 11 is coupled to the output terminal of the horizontal downscaler 10 and the output terminal is coupled to an input terminal of the vertical scaling unit 20.

The vertical scaling unit 20 is coupled to the output terminal of the horizontal downscaler 10 or to the image input terminal. The vertical scaling unit 20 operates under the input clock frequency Sclk. That is to say, the vertical scaling unit 20 operates at a low working frequency.

The synchronization unit 30 has an input terminal and an output terminal. The synchronization unit 30 synchronizes the output data received from the vertical scaling unit 20, and then outputs an output signal having an output clock frequency Oclk.

The horizontal upscaler 40 has an input terminal and an output terminal. The horizontal upscaler 40 is coupled to the output terminal of the synchronization unit 30 to perform an interpolation operation on the input image data to upscale the image data. Two switches, SW1, SW2, are added to offer a selective control method to control an image input route depending on horizontal downscaling or upscaling requirements. The route can be chosen to go through or to bypass the horizontal downscaler 10 or the horizontal upscaler 40, or both.

The two switches, SW1 and SW2, both have an input terminal and two output terminals. The selective control method can be achieved by having the first switch SW1 coupled to the image input terminal and a second switch SW2 coupled to the output terminal of the synchronization unit 30. The two output terminals of the first switch SW1 are coupled respectively to the input terminals of the horizontal downscaler 10 and the vertical scaling unit 20, so as to be able to selectively control whether or not the image signal goes through the horizontal downscaler 10. The two output terminals of the second switch SW2 are coupled respectively to the horizontal upscaler 40 and an image output terminal, so as to be able to selectively control whether or not the image signal goes through the horizontal upscaler 40. However, the first switch SW1 and the second switch SW2 are only taken as an example of a preferred embodiment of the selective control method in the present invention. Various modifications and similar arrangements and procedures that can achieve the same objective should be covered in this invention.

Figure 6:
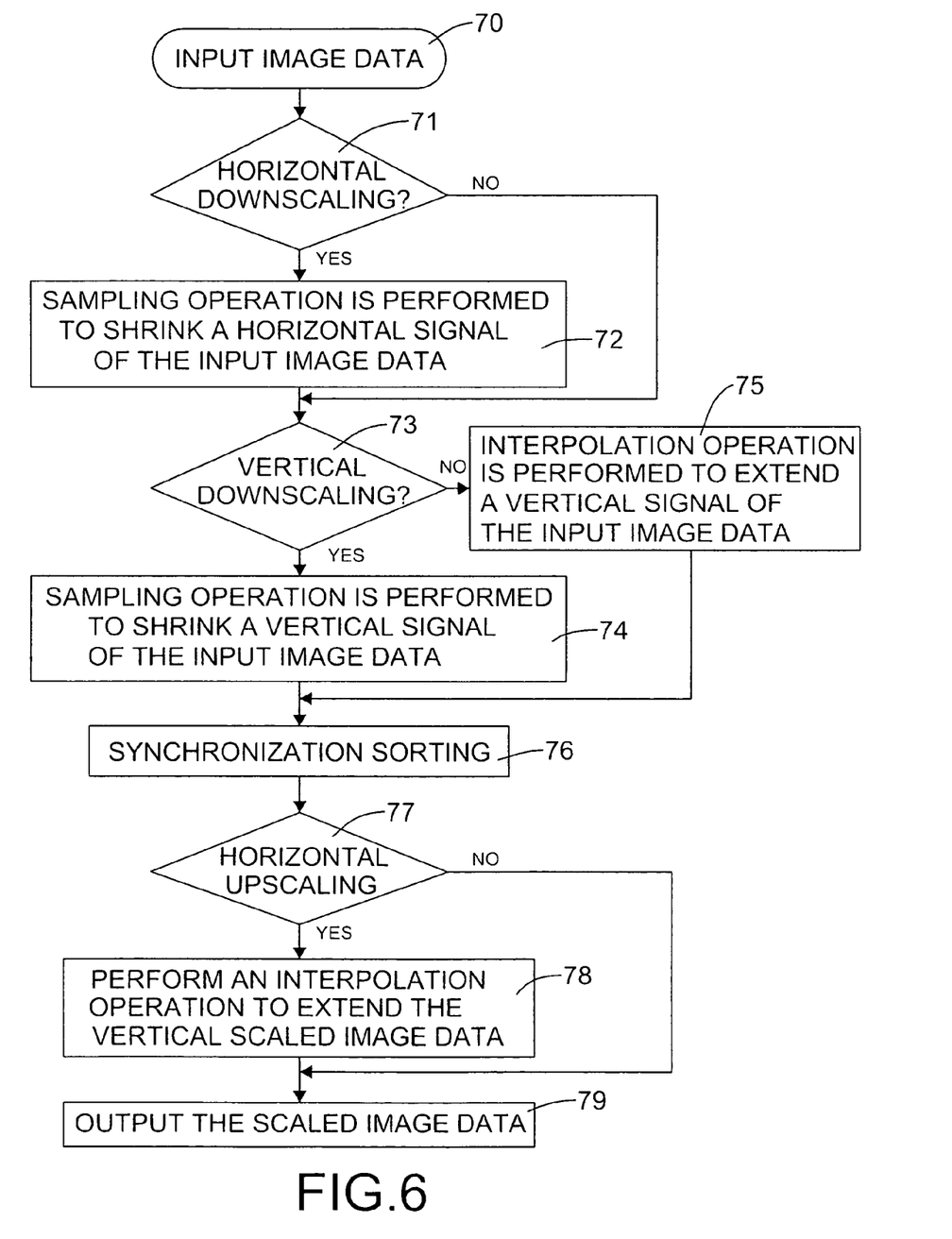
FIG. 6 is a process flow diagram of the image scaling method of the present invention.

According to the above-described components, an image scaling method includes a plurality of steps as shown in FIG. 6.

First, image data is inputted in step 70. Whether or not horizontal downscaling is required for image processing is determined in step 71. If an image is to be horizontally downscaled, a sampling operation is performed to shrink a horizontal signal of the input image data in step 72. On the contrary, if the image will not be horizontally downscaled, step 72 is bypassed. Next, whether or not vertical downscaling is required for image processing is determined in step 73. If the image is to be vertically downscaled, a sampling operation is performed to shrink a vertical signal of the input image data in step 74. On the contrary, if the image will not be vertically downscaled, an interpolation operation is performed to extend a vertical signal of the input image data in step 75. Next, a synchronization sorting operation to synchronize the vertically scaled image data in accordance with an output clock frequency is performed in step 76. Finally, whether or not horizontal upscaling is required for image processing is determined in step 77. If the image will be horizontally upscaled, an interpolation operation is performed to extend the vertically scaled image data in step 78, and then the extended horizontal signal is outputted in step 79. On the contrary, if the image will not be horizontally upscaled, step 78 is bypassed and the image data after synchronization sorting is directly outputted in step 79.

Hence, the present invention can provide four kinds of scaled image output formats. With reference to FIG. 1 again:

With the first format, an image is horizontally and vertically downscaled.

When the first image output format is chosen, the first switch SW1 allows the input image data to go through to the input terminal of the horizontal downscaler 10, and the second switch SW2 connects the output terminal of the synchronization unit 30 to the image output terminal. Thereby the input image data goes through the horizontal downscaler 10 first, where a sampling operation is performed on the input image data to horizontally shrink the signal of the input image data. Then the horizontally downscaled signal of the image data is delivered to the first buffer area 11 and the vertical scaling unit 20. A sampling operation is then performed to shrink the vertical signal of the input image data. Finally, the downscaled image data is processed by the synchronization sorting step, and then directly outputted.

With the second format, the image is horizontally downscaled and vertically upscaled.

When the second image output format is chosen, the first switch SW1 allows the input image data to go through to the input terminal of the horizontal downscaler 10, and the second switch SW2 connects the output terminal of the synchronization unit 30 to the image output terminal. Thereby the input image data goes through the horizontal downscaler 10 first, where a sampling operation is performed on the input image data to shrink the horizontal signal of the input image data. Then the horizontally downscaled signal of the image data is delivered to the first buffer area 11 and the vertical scaling unit 20. An interpolation is performed to extend a vertical signal of the input image data. Finally, the scaled image data is processed by the synchronization sorting step, and then directly outputted.

With the third format, the image is horizontally upscaled and vertically downscaled.

When the third image output format is chosen, the first switch SW1 allows the input image data to go directly to the first buffer area 11 and the vertical scaling unit 20 without passing through the horizontal downscaler 10. The second switch SW2 connects the output terminal of the synchronization unit 30 to the input terminal of the horizontal upscaler 40. Thereby the input image data is sent directly to the vertical scaling unit 20 where a sampling operation is performed to downscale the vertical signal of the input data. The vertically downscaled image data is processed by the synchronization sorting step, and then outputted to the horizontal upscaler 40.

The horizontal upscaler 40 extends the horizontal signal of the image data, and then outputs the scaled image data.

With the fourth format, the image is horizontally and vertically upscaled.

When the fourth image output format is chosen, the first switch SW1 allows the input image data to go directly to the first buffer area 11 and the vertical scaling unit 20 without passing the horizontal downscaler 10. The second switch SW2 connects the output terminal of the synchronization unit 30 to the input terminal of the horizontal upscaler 40. Thereby the input image data can be sent directly to the vertical scaling unit 20 where an interpolation is performed to extend the vertical signal of the input image data. The vertical upscaled image data is processed by the synchronization sorting step, and then to outputted to the horizontal upscaler 40. The horizontal upscaler 40 extends the horizontal signal of the image data, and then outputs the upscaled image data.

Figure 2:
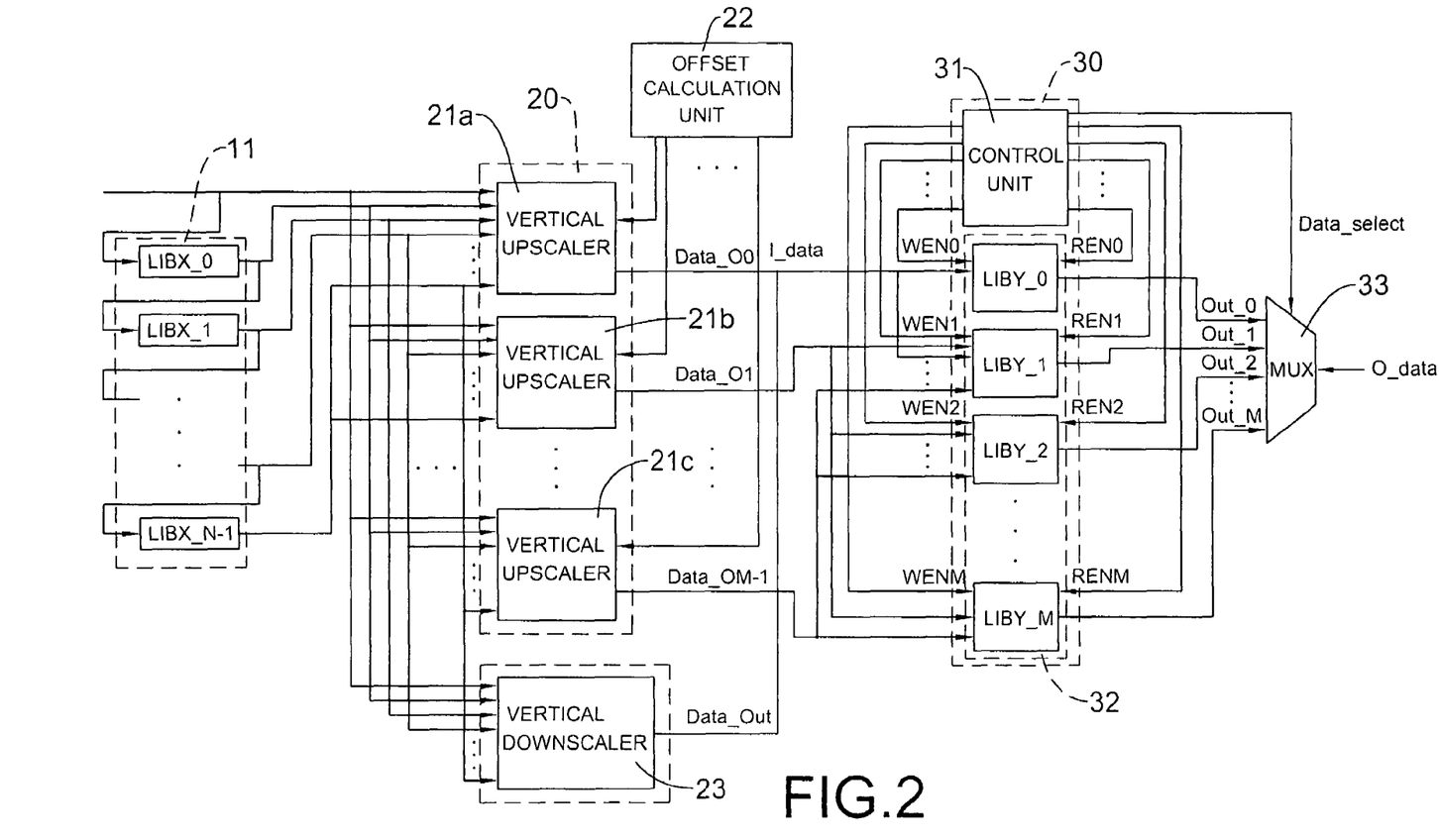
FIG. 2 is a detailed functional block diagram of a part of the example of the preferred embodiment of the present invention.

With reference to FIG. 2, the detailed circuits and operation of the vertical scaling unit 20 and the synchronization unit 30 will be illustrated as follows.

The vertical scaling unit 20 includes a plurality of vertical upscalers 21a~21c, an offset calculation unit 22, and a vertical downscaler 23.

The input terminals of the vertical upscalers 21a~21c are coupled to the image input terminal and the output terminals of the line buffers LIBX_0~LIBX_N-1 of the first buffer area 11 for performing the interpolation. An output terminal of the offset calculation unit 22 is coupled to the input terminals of the vertical upscalers 21a~21c for calculating an interpolated pitch value of each of the vertical upscalers 21a~21c. Further, an input terminal of the vertical downscaler 23 is coupled to the image input terminal and the output terminals of the line buffers LIBX_0~LIBX_N-1 of the first buffer area 11, and an output terminal of the vertical downscaler 23 is coupled to an output terminal of any one of the vertical upscalers 21a~21c.

The synchronization unit 30 includes a control circuit 31 having a built-in specific sorting control method, a second buffer area 32, and a multiplexer 33.

The second buffer area 32 includes a plurality of second line buffers LIBY_0~LIBY_M. Write terminals WEN0~WENM and read terminals REN0~RENM of the second line buffers LIBY_0~LIBY_M are coupled with the control circuit 31, and input terminals of the second line buffers LIBY_0~LIBY_M are coupled to the corresponding vertical upscalers 21a~21c. The quantity of the second line buffers LIBY_0~LIBY_M is the sum of the quantity of the vertical upscalers 21a~21c and the quantity of the vertical downscalers 23.

The multiplexer 33 is coupled to an output terminal of the control circuit 31 and the output terminals of the second line buffers LIBY_0~LIBY_M to output the vertically scaled image.

Since image downscaling and upscaling are processed individually, the output terminal of the vertical downscaler 23 and the output terminal of the first vertical upscaler 21a can be coupled to the corresponding second line buffers LIBY_0~LIBY_M.

Furthermore, because the synchronization unit 30 uses the fast output clock frequency, the synchronization unit 30 is made up by the second buffer area 32 having the plurality of the second line buffers LIBY_0~LIBY_M.

The first vertical upscaler 21a performs an interpolation to output the data Data_O0 to the second line buffer LIBY_0. Furthermore, the other vertical upscalers, 21b and 21c, also perform interpolations to output the data Data_O1 and Data_OM-1 simultaneously to the other second line buffers, LIBY_1~LIBY_M. With the control circuit 31 to trigger the write terminals WEN0~WENM of the second line buffers LIBY_0~LIBY_M enabled, the output data of the vertical scaling unit 20 is inputted to the second line buffers LIBY_0~LIBY_M. Then the control circuit 31 triggers the read terminals REN0~RENM of the second line buffers LIBY_0~LIBY_M to read the data from the second line buffers LIBY_0~LIBY_M.

Since the interpolation operation generates more output data than input data, a read working frequency must be higher than a write working frequency. A selector, Data_select, of the multiplexer 33 is coupled to the output terminal of the control circuit 31. The control circuit 31 controls the data output sequence of Out_0, Out_1, Out_2 up to Out_M of the second line buffers LIBY_0~LIBY_M. Finally an image data O_data can be outputted to a next stage horizontal upscaler (not shown in the diagram).

In regards to image upscaling processing, the conventional technique mainly involves first synchronize sorting the input image data and then performing the interpolation operation on the vertical and horizontal signals to upscale the signals, so as to reduce the quantity of the line buffers required. However, the interpolation operation only can be performed on one row of the image data within a processing period of time. On the other hand, the present invention first upscales the input image data in a vertical direction, and then performs the synchronization sorting process, so that the present invention can perform the interpolation operation on multiple image data within the processing period of time. Then the present invention performs the synchronization sorting process and the horizontal interpolation operation on the vertically upscaled image data. Hence, the present invention separates the vertical interpolation operation and the horizontal interpolation operation when processing a huge amount of data. This prevents huge amounts of data from being concentrated at the final stage to be processed, which may cause too much power consumption. Moreover, in order to achieve the objective of processing the vertical signals of multiple input image data within the processing period of time in the present invention, the horizontal downscaler and the vertical scaling unit operate under the input clock frequency and only the synchronization unit and the horizontal upscaler require the higher output clock frequency. Therefore, the present invention reduces the use of the intermediate clock frequency that is used in the conventional technique, so as to simplify the circuit design of the image scaler.

The following description further illustrates a synchronization technique of the synchronization unit of the present invention.

If a maximum vertical upscaling factor is equal to M, then M vertical upscalers are required. Since the interpolation operation requires interpolated pitch values, assuming a pitch for every two image pixels equal to 1, the interpolated pitch values must between 0 and 1. Each of the interpolated pitch values for the vertical upscalers is calculated as follows:

Step 1:

$R = 0$ $S = 1/M$ where $M = N_o/N_i$, $N_o$: the number of output image lines and $N_i$: the number of source image lines $S_1 = R$ -continued $$S_2 = R + S$$
$$\vdots$$
$$S_M = R + (M-1)S$$
$$S_{M+1} = R + M \cdot S$$

Step 2:
$$R_{next} = S_{M+1} - 1$$

Step 3:
$$R = R_{next}$$

where:

S1: represents the interpolated pitch value of the first vertical upscaler;

S2: represents the interpolated pitch value of the second vertical upscaler;

SM: represents the interpolated pitch value of the last vertical upscaler;

SM+1: determines whether the interpolated pitch values exceed the pitch for every two image pixels;

R: represents an initial value of the interpolated pitch values;

S: represents a step value of the interpolated pitch values.

S is equal to 1/M where M is the vertical upscaling factor that is defined as the number of output image lines No divided by the number of source image lines Ni. Rnext is the initial value of the next interpolated pitch value. The step one in the above formula calculates the interpolated pitch values S1,S2, . . . ,SM,SM+1, where S1=R, S2=R+S, SM=R+(M−1)S, and SM+1=R+M*S. The step two in the above formula shows that Rnext equals SM+1−1. Finally, the step three shows that the value of Rnext is passed to R. For example, if M=2, then S=0.5, S1=R=0, S2=0.5, and S3=1.0. Since S3 is large equal to 1, Rnext is equal to S3 minus 1, which is equal to 0, so that 0 is passed to R. Then a result of S1=0 will be used in the next interpolation operation by the same formula. At this moment, the interpolated pitch values S1 and S2 are outputted to the first vertical upscaler and the second vertical upscaler to perform the interpolation operation to make the first vertical upscaler start to output data.

Figure 3:
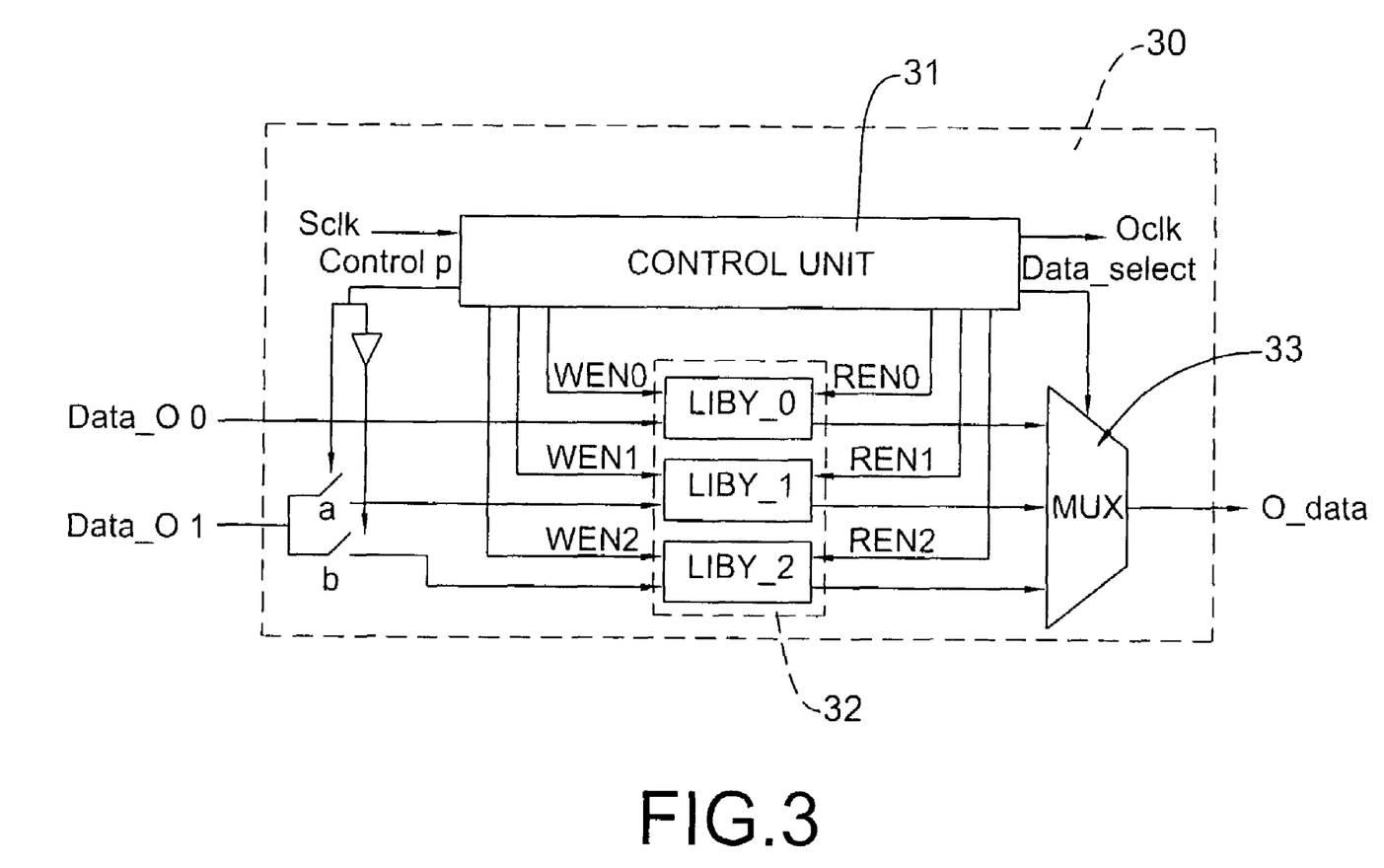
FIG. 3 is a functional block diagram of a preferred embodiment of a synchronization unit of the present invention.

With reference to FIG. 3, an operation instruction of the synchronization unit 30 is illustrated as follows. Firstly, the vertical upscaling factor of the vertical scaling unit 20 is assumed to be 2. Then the two vertical upscalers 21a and 21b are required, and also three line buffers LIBY_0~LIBY_2 for performing the synchronization process are required to make up the second buffer area 32. The first vertical upscaler 21a performs the interpolation operation and outputs the data Data_O0 to send to the coupled second line buffer LIBX_0. The second vertical upscaler 21a performs the interpolation operation and outputs the data Data_O1 to simultaneously send to the coupled second line buffers LIBX_1 and LIBX_2. At this moment, the control circuit 31 of the synchronization unit 30 outputs a control signal Control_p to control the output data Data_O1 to only be able to send to the second line buffers LIBX_1 and LIBX_2 simultaneously.

Moreover, the control circuit 31 further controls the write terminals WEN0~WEN2 of the second line buffers LIBY_0~LIBY_2 to determine whether the output data, Data_O0 and Data_O1, of the vertical upscalers, 21a and 21b, should be written to the second line buffers, LIBY_0~LIBY_2. Then the control circuit 31 further controls the read terminals REN0~REN2 of the second line buffers LIBY_0~LIBY_2 to read data in the second line buffers LIBY_0~LIBY_2.

Figure 4:
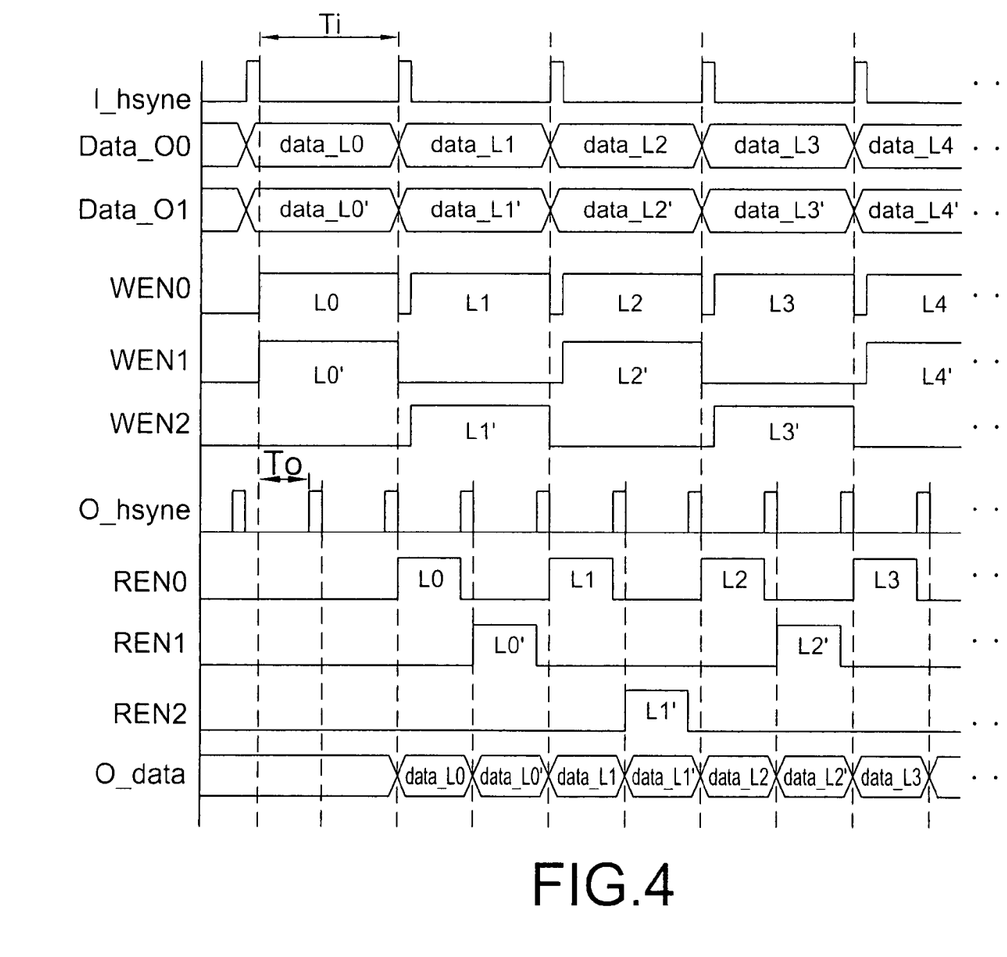
FIG. 4 is a timing diagram of an image upscaling process of the present invention.

With reference to FIG. 4, a control timing diagram shows that the control circuit 31 controls the write and read processes of the second line buffers LIBY_0~LIBY_2. I_hsync represents a synchronization control signal of an input scan line, and O_hsync represents a synchronization control signal of an output scan line. Ti represents a time period for one input scan line, and To represents a time period for one output scan line.

The control signal of the control circuit 31 is highly active, and a read rate is two times that of a write rate, which implies that To is half of Ti. In this example, O_hsync must be controlled to be earlier than I_hsync to prevent a conflict between read and write addresses that can cause data overwrite issues.

In the first Ti time period as shown in the diagram, the write terminals WEN0 and WEN1 are triggered. That is to say, the output data, data_L0 of Data_O0, data_L0' of Data_O1 of the vertical upscalers 21a and 21b are written to the second line buffers LIBY_0~LIBY_1.

In the second Ti time period, the write terminals WEN0 and WEN2 are triggered, so that data_L1 and data_L1' are written respectively to the second line buffers LIBY_0 and LIBY_2. Moreover, in the first half period of Ti, the read terminal REN0 is triggered; while in the later half period of Ti, the read terminal REN1 is triggered. That is to say, the data_L0 is first read from the second line buffer LIBY_0, then the data_L0' is read from the second line buffer LIBY_1.

In the third Ti time period, the write terminals WEN0 and WEN1 are triggered, so that data_L2 and data_L2' are written respectively to the second line buffers LIBY_0 and LIBY_1. In the first half period of Ti, the read terminal REN0 is triggered; while in the later half period of Ti, the read terminal REN2 is triggered. That is to say, the data_L1 is first read from the second line buffer LIBY_0, then the data_L1' is read from the second line buffer LIBY_2.

With this control timing execution, the control circuit 31 finally controls the selector Data_select of the multiplexer 33 to output data O_data with the data output sequence of Out_L0, Out_L0', Out_1, Out_1' and so on, so as to make the output clock frequency Oclk two times that of the input clock frequency Sclk.

Figure 5:
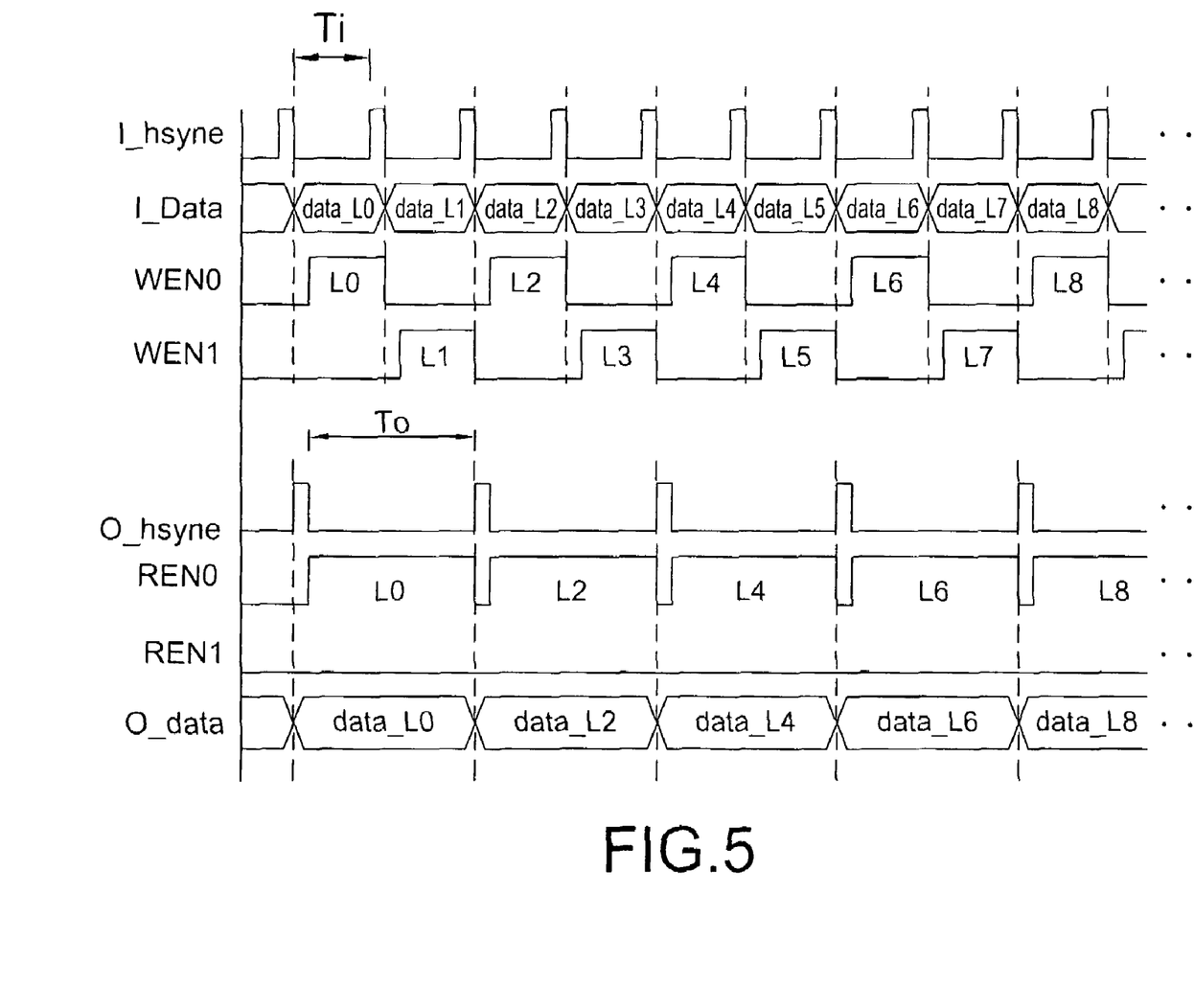
FIG. 5 is a timing diagram of an image downscaling process of the present invention.

With the same operational design as described above, the vertical downscaling factor of the vertical downscaler 23 is assumed to be 0.5. Then the synchronization unit 30 requires two of the second line buffers LIBY_0 and LIBY_1 to make up the second buffer area 32. At this moment, To is two times of Ti. That is to say, the write rate is two times of the read rate. In the image downscaling process, O_hsync must be controlled to be later than I_hsync to prevent the conflict between the read and write addresses that can cause the data overwrite issue.

With reference to FIG. 5, the control timing diagram shows that the control circuit 31 controls the write and read terminals WEN0, WEN1, REN0, and REN1 of the second line buffers LIBY_0 and LIBY_1.

In the first Ti time period as the diagram, the write terminal WEN0 is triggered, so as to make the data data_L0 of I_data written to the second line buffers LIBY_0.

In the second Ti time period, the write terminal WEN1 is triggered, so as to make the data data_L1 of I_data written to the second line buffers LIBY_1. Moreover, in the first time period To, the read terminal REN0 of the second line buffer LIBY_0 is triggered, so that the data data_L0 is read from the second line buffer LIBY_0.

In the third Ti time period, the write terminal WEN0 is triggered, so as to make the data data_L2 of I_data written to the second line buffers LIBY_0.

In the fourth Ti time period, the write terminal WEN1 is triggered again, so as to make the data data_L3 of I_data written to the second line buffers LIBY_1. Moreover, in the second time period To, the read terminal REN0 of the second line buffer LIBY_0 is triggered, so that the data data_L2 is read from the second line buffer LIBY_0. With the same operation, the final output data sequence of the output data O_data is data_L0, data_L2, data_L4, data_L6, data_L8 and so on.

Further, a sequence of reading the second line buffers LIBY_0, LIBY_1 of the second buffer area 32 is determined in accordance with the vertical downscaling factor instead of reading the LIBY_0 first or reading the LIBY_0 and LIBY_1 by turns. For example, if the vertical downscaling factor equals ⅔, the sequence of reading the second buffer area 32 is LIBY_0, LIBY_1, skip LIBY_0 and following LIBY_1, and so forth. Thereby the final output data O_data is data_L0, data_L1, data_L3, data_L4, data_L6 in sequence.

Therefore, the present invention separately allocates the horizontal downscaler in front of the vertical scaling unit and the horizontal upscaler in back of the vertical scaling unit to operate in coordination to the selective control method of downscaling or upscaling requirements to make the input image data go through the horizontal downscaler or the horizontal upscaler. In this way, the input signal is processed in only two stages, so that the present invention can not only reduce the process loading of huge amounts of the data volume in the final stage, it can also reduce power consumption. In comparison with the conventional technique, the present invention can achieve a two-dimensional image scaling process by using only two clock frequencies, so as to reduce the complexity of the circuits of the image scaler.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image scaler comprising
a horizontal downscaler,
a horizontal upscaler,
a vertical scaling unit,
a first buffer area, and
a synchronization unit, wherein
the horizontal downscaler is configured in front of the vertical scaling unit and the horizontal upscaler is configured in back of the vertical scaling unit, wherein a selective control method is used to control an image input route depending on horizontal downscaling or upscaling requirements, so as to choose to go through or to bypass the horizontal downscaler or the horizontal upscaler to horizontally and vertically resize an image;
the horizontal downscaler comprises an input terminal coupled to an image input terminal, wherein an input clock frequency is used as a base signal for image processing;
the first buffer area comprises a plurality of first line buffers connected in series, wherein an input terminal of the first line buffer is coupled to the horizontal downscaler or the image input terminal;
the vertical scaling unit is coupled to the horizontal downscaler or the image input terminal, wherein the input clock frequency is used as the base signal of the vertical scaling signal for image processing;
the synchronization unit comprises an input terminal coupled to an output terminal of the vertical scaling unit to synchronize sorting the upscaled image data and then to output a vertical signal, wherein the output data of the vertical scaling unit that the synchronization unit receives uses the input clock frequency as the base signal, and an output clock frequency is used as a base signal for processing an synchronization sorting operation; and
the horizontal upscaler is coupled to an output terminal of the synchronization unit to perform an interpolation on a horizontal signal of input image data to upscale the image data, wherein the horizontal upscaler takes the output clock frequency as the base signal.

2. The image scaler as claimed in claim 1, wherein the vertical scaling unit comprises:
a plurality of vertical upscalers, wherein input terminals of the vertical upscalers are coupled respectively to the image input terminal and output terminals of the line buffers of the first buffer area for performing the interpolation;
an offset calculation unit comprising an output terminal coupled to the input terminals of the vertical upscalers for calculating an interpolated pitch value of each of the vertical upscalers; and
a vertical downscaler comprising an input terminal coupled to the image input terminal and the output terminals of the line buffers of the first buffer area, and an output terminal coupled to an output terminal of any one of the vertical upscalers.

3. The image scaler as claimed in claim 1, wherein the synchronization unit comprises:
a control circuit having a built-in specific sorting control method; a second buffer area comprising a plurality of second line buffers, wherein write and read terminals of the second line buffers are coupled with the control circuit, and input terminals of the second line buffers are coupled to the corresponding vertical upscalers; and
a multiplexer coupled to an output terminal of the control circuit and the output terminals of the second line buffers of the second buffer area to output the vertically scaled image.

4. The image scaler as claimed in claim 2, wherein the synchronization unit comprises:
a control circuit having a built-in specific sorting control method;
a second buffer area comprising a plurality of second line buffers, wherein write and read terminals of the second line buffers are coupled with the control circuit, and input terminals of the second line buffers are coupled to the corresponding vertical upscalers; and
a multiplexer coupled to an output terminal of the control circuit and the output terminals of the second line buffers of the second buffer area to output the vertically scaled image.

5. The image scaler as claimed in claim 3, wherein the quantity of the second line buffers of the second buffer area of the synchronization unit is the sum of the quantity of the vertical upscalers and the quantity of the vertical downscaler of the vertical scaling unit.

6. The image scaler as claimed in claim 5, wherein the output terminal of the first vertical upscaler of the vertical scaling unit is only coupled to the first line buffer of the synchronization unit, and the output terminals of the other vertical upscalers are coupled respectively to the other line buffers of the synchronization unit.

7. An image scaling method comprising a plurality of steps of:
   inputting image data;
   determining whether or not horizontal downscaling is required for image processing: if an image will be horizontally downscaled, a sampling operation is performed to shrink a horizontal signal of the input image data; if the image will not be horizontally downscaled, this step is bypassed;
   determining whether or not vertical downscaling is required for image processing: if the image will be vertically downscaled, a sampling operation is performed to shrink a vertical signal of the input image data; if the image will not be vertically downscaled, an interpolation is performed to extend a vertical signal of the input image data;
   performing synchronization sorting to synchronize the vertically scaled image data in accordance with an output clock frequency;
   determining whether or not horizontal upscaling is required for image processing: if the image will be horizontally upscaled, an interpolation is performed to extend the vertically scaled image data and to output an image signal of the horizontal signal that is finally extended; if the image will not be horizontally upscaled, the image data after synchronization sorting is directly outputted; and
   wherein a first method comprises executing a horizontal downscaling process first and then executing a vertical scaling process and a second method comprises executing the vertical scaling process first and then executing a horizontal upscaling process.

* * * * *

UNITED STATES PATENT AND TRADEMARK OFFICE
CERTIFICATE OF CORRECTION

PATENT NO.        : 7,609,326 B2                                                Page 1 of 1
APPLICATION NO.   : 11/294492
DATED             : October 27, 2009
INVENTOR(S)       : Jen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Twelfth Day of October, 2010

David J. Kappos
*Director of the United States Patent and Trademark Office*